H. VAN De WATER.
WATER-WHEEL.

No. 178,567.

2 Sheets—Sheet 1.

Patented June 13, 1876.

WITNESSES.
C. M. Lenyon.
J. Wm. Carners.

INVENTOR.
Henry Van De Water
per
F. A. Lehmann, Atty.

2 Sheets—Sheet 2.

H. VAN De WATER.
WATER-WHEEL.

No. 178,567. Patented June 13, 1876.

WITNESSES.

INVENTOR
Henry Van De Water
per
F. A. Lehmann, Atty.

UNITED STATES PATENT OFFICE.

HENRY VAN DE WATER, OF GENEVA, NEW YORK.

IMPROVEMENT IN WATER-WHEELS.

Specification forming part of Letters Patent No. 178,567, dated June 13, 1876; application filed June 17, 1875.

*To all whom it may concern:*

Be it known that I, HENRY VAN DE WATER, of Geneva, in the county of Ontario and State of New York, have invented certain new and useful Improvements in Water-Wheels; and I do hereby declare the following to be a full, clear, and exact description of the invention, such as will enable others skilled in the art to which it pertains to make and use it, reference being had to the accompanying drawings, which form part of this specification.

My invention relates to an improvement in water-wheels; and consists in the peculiar construction of the gates, whereby leakage and waste of water are prevented.

My invention is intended as an improvement upon the patent granted J. Temple, February 8, 1859.

Figure 1:
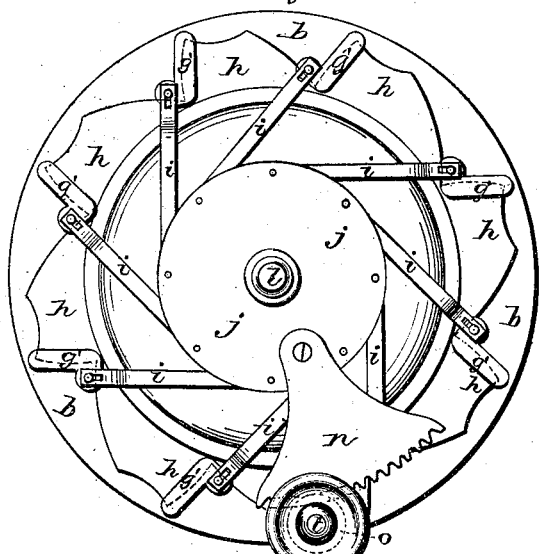
Figure 2:
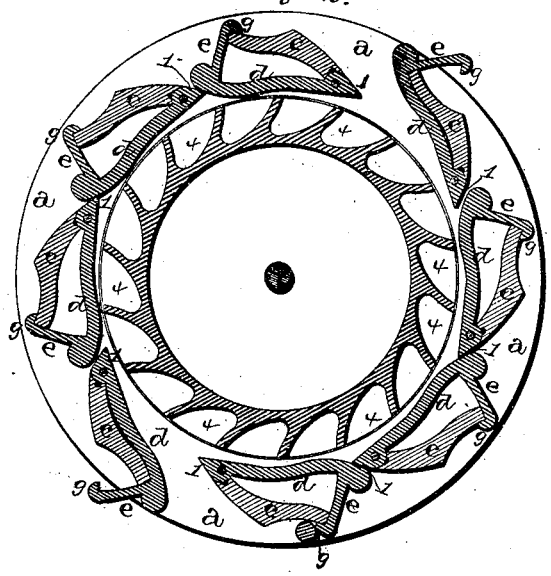
Figure 3:
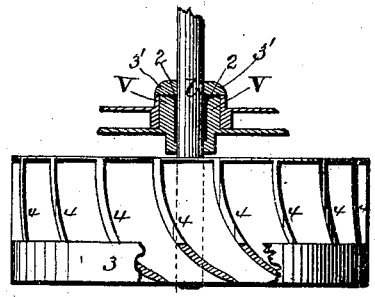
Figure 4:
Figure 5:
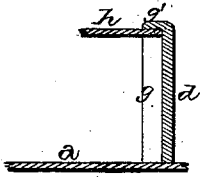

Figure 1 is a plan view of the wheel complete. Fig. 2 is a horizontal section of the casing, taken through the gates. Figs. 3, 4, 5 are detail views of my invention.

$a$ represents the lower part of the curb, and $b$ the upper part thereof, with walls $c$ between them, to form chutes or water-ways for the passage of the water to the wheel. Pivoted just at the inner ends of these walls are the gates $d$, which have a slightly-curved inner face to correspond to the curve of the wheel, and a guard, $e$, formed upon their outer ends. The inner end of each gate extends a short distance beyond the pivot-point, as shown, so as to form an abutment, 1, against which the front end of the next gate abuts, so as to form a water-tight joint, and so as to guide the water to the buckets 4 of the wheel, and cause it to strike them directly at right angles. Where these abutments are not used the joints remain tight but a very short time, and then leak badly; but where the gates have them formed upon them the joint always remains tight, and the longer the gates are used, and the more they wear, the tighter do the joints become.

Upon the outer vertical edge and the top edge of the guards $e$ are formed the flanges $g\ g'$, which are so shaped as to overlap the outer ends of the walls $c$ and the projecting plates $h$ of the part $b$, and thus form tight joints when the gates are closed.

The gates are operated by means of rods $i$, that connect them with a disk, $j$, placed around the wheel-shaft $l$, and which disk is provided with a cogged segment, $n$, which segment meshes with a pinion, $o$, on an upright shaft $t$, that is provided with a suitable hand-wheel for turning the same.

The top of the curb is provided with a hub, $v$, that has suitable holes 2 for the reception of tallow or oil for lubricating the spindle. Over this hub is placed a cap, 3', to exclude dust and dirt.

The wheel is cast in one solid piece, is hollow in the center, so as to be as light as possible, and has a band, 3, around the lower ends of the buckets 4. The buckets are so shaped that as the water passes through the chutes it strikes them with full force, and starts the wheel by concussion. As the buckets descend they are contracted in size, and assume a circular shape back of the band, and have a circular vent or discharge.

By means of this contracted circular shape the water acts by both its own weight and reaction. The circular discharge causes a freer discharge of the water and a greater reaction.

Having thus described my invention, I claim—

1. The horizontally-moving gates $d\ e$, provided with the vertical flanges $g$, that overlap the outer edges of the walls $c$, the said flanges being so arranged that no wear shall come upon them in the moving back and forth of the gates, substantially as set forth.

2. The horizontally-moving gate $d\ e$, having the horizontal flanges $g'$ formed upon their front ends for overlapping the edges of the top plate $h$, and forming water-tight joints, substantially as shown.

3. The horizontally-moving gates $d\ e$, having the horizontal flanges $g'$ for overlapping the top plate $h$, and vertical flanges $g$ for overlapping the ends of the walls $c$, substantially as specified.

In testimony that I claim the foregoing I have hereunto set my hand and seal this 10th day of June, 1875.

HENRY VAN DE WATER. [L. S.]

Witnesses:
 F. O. MASON,
 WM. ROGER HOPKINS.